US008881023B2

(12) United States Patent
Cook et al.

(10) Patent No.: US 8,881,023 B2
(45) Date of Patent: Nov. 4, 2014

(54) METHODS AND APPARATUS FOR SYNCHRONIZING VIRTUAL AND PHYSICAL MOUSE POINTERS ON REMOTE KVM SYSTEMS

(75) Inventors: Colin N. B. Cook, Riverton, UT (US); Warren K. Unice, Sandy, UT (US); Adam J. Boyle, American Fork, UT (US)

(73) Assignee: Avocent Utah, Draper, UT (US)

( * ) Notice: Subject to any disclaimer, the term of this patent is extended or adjusted under 35 U.S.C. 154(b) by 3241 days.

(21) Appl. No.: 10/792,286

(22) Filed: Mar. 4, 2004

(65) Prior Publication Data

US 2005/0007344 A1    Jan. 13, 2005

Related U.S. Application Data

(60) Provisional application No. 60/485,598, filed on Jul. 7, 2003.

(51) Int. Cl.
    *G06F 3/00*      (2006.01)
    *G06F 3/0354*    (2013.01)
    *G06F 3/038*     (2013.01)
    *G06F 3/14*      (2006.01)

(52) U.S. Cl.
    CPC ............ *G06F 3/038* (2013.01); *G06F 3/03543* (2013.01); *G06F 3/1462* (2013.01)
    USPC ......................................... 715/751; 715/753

(58) Field of Classification Search
    CPC .............................. G06F 3/03543; G06F 3/038
    USPC ................. 715/500.1, 751, 761, 753
    See application file for complete search history.

(56) References Cited

U.S. PATENT DOCUMENTS

| 5,410,681 | A  | * | 4/1995  | Jessen et al. ..................... 703/27  |
| 5,828,372 | A  | * | 10/1998 | Kameda ........................ 715/751 |
| 5,986,644 | A  | * | 11/1999 | Herder et al. ................. 345/158 |
| 6,072,463 | A  | * | 6/2000  | Glaser ........................... 715/753 |
| 6,343,260 | B1 | * | 1/2002  | Chew ............................. 702/122 |
| 6,829,726 | B1 | * | 12/2004 | Korhonen ....................... 714/25 |
| 6,904,389 | B2 | * | 6/2005  | Hornberger et al. .......... 702/188 |
| 7,127,678 | B2 | * | 10/2006 | Bhesania et al. .............. 715/744 |
| 7,155,653 | B2 | * | 12/2006 | Monnerat ..................... 714/742 |
| 7,162,407 | B2 | * | 1/2007  | Poley et al. ..................... 703/24 |
| 2002/0038334 | A1 | * | 3/2002 | Schneider et al. ............ 709/203 |
| 2002/0129353 | A1 | * | 9/2002 | Williams et al. .............. 717/175 |
| 2003/0005177 | A1 | * | 1/2003 | Duran et al. .................. 709/327 |

FOREIGN PATENT DOCUMENTS

JP             05083413 A   *   4/1993

* cited by examiner

*Primary Examiner* — William Bashore
*Assistant Examiner* — Gregory A Distefano
(74) *Attorney, Agent, or Firm* — Davidson Berquist Jackson & Gowdey, LLP

(57) ABSTRACT

A method and system is disclosed for synchronizing the virtual and physical mouse cursors of a local computer and a remotely controlled computer. Video signals generated by a host computer are transmitted to a client computer in order to allow the user of a client computer to have a virtual presence on the host computer. However, the signals transmitted by the host computer may contain errors that can cause a physical mouse to lose synchronization with a virtual mouse. Therefore this virtual presence architecture uses USB protocol and human interface descriptors that support the movement of a mouse to an absolute position in order to synchronize a virtual mouse cursor with a physical mouse cursor.

6 Claims, 4 Drawing Sheets

METHODS AND APPARATUS FOR SYNCHRONIZING VIRTUAL AND PHYSICAL MOUSE POINTERS ON REMOTE KVM SYSTEMS

This application claims priority of U.S. Provisional Patent Application Ser. No. 60/485,598 filed Jul. 7, 2003, which is hereby fully incorporated by reference.

FIELD OF THE INVENTION

This invention generally relates to the field of remote computer access. More specifically, an embodiment of the present invention relates to virtual presence architectures.

BACKGROUND OF THE INVENTION

It is often the case that a host computer is located physically distant from its operator. Some products have been created to facilitate remote control of a computer using devices that remotely project the keyboard, video and mouse. These are typically called keyboard-video-mouse (KVM) devices. For example, a KVM Switch enables a single keyboard, mouse and video display to be shared by multiple computers. A KVM device enables a keyboard, mouse and video display to be viewed remotely, with typically several hundred feet of separation. Remote Control Software enables a computer to "take over" a remote computer and use the local machine to provide keyboard and mouse input, and video output over a network. Additionally, there are specialized hardware components that interact with proprietary software to provide remote KVM functionality over a network.

Each of these approaches has disadvantages. More specifically, remote KVM systems generally employ relative movements of the mouse to keep the mouse in sync (e.g., move 5 pixels left from where you are). The use of the relative movements is common because real physical mice use relative movements. Since computer operating systems (OS's) are sometimes busy with other tasks, the mouse movement messages may be lost or skipped. Therefore, if a virtual pointer is maintained in a remote KVM system, it may no longer be in sync with the originating system. Both PS/2 and USB mice send these same relative movements messages. Consequently, it is desirable to implement a mouse synchronization system for use with a remote KVM system that can synchronize mouse movements based on an absolute position.

BRIEF SUMMARY OF THE INVENTION

The present invention, which may be implemented utilizing a general-purpose digital computer, in certain embodiments of the present invention, includes novel methods and apparatus to provide efficient, effective, and/or flexible ability to provide mouse synchronization without requiring access to the internal state of the host.

In another embodiment of the present invention, existing local area network (LAN) infrastructure is utilized for remote control of host computers without requiring significant reconfiguration of their software and/or hardware.

One embodiment of the present invention includes an architecture that provides remote control of a host computer over existing Internet protocol (IP) network infrastructure without requiring significant changes to the remote host, but allows deployment with different levels of intrusiveness (e.g., depending on the requirements of the application). In another embodiment of the present invention, the implementation of the architecture requires no software changes to the remote host. In a further embodiment of the present invention, a separate device with its own power and case is utilized (e.g., a stand-alone device), such as a peripheral component interconnect (PCI) card.

In a further embodiment of the invention, the mouse movements on the host computer and the mouse movements on the remote computer may be synchronized. Human interface descriptors (HIDs), operating on universal serial bus (USB) protocol, can be used to move a cursor on a remote host computer to an absolute position. Consequently, the local client computer can use this information to maintain synchronization with its cursor.

DETAILED DESCRIPTION OF THE INVENTION

Figure 1:
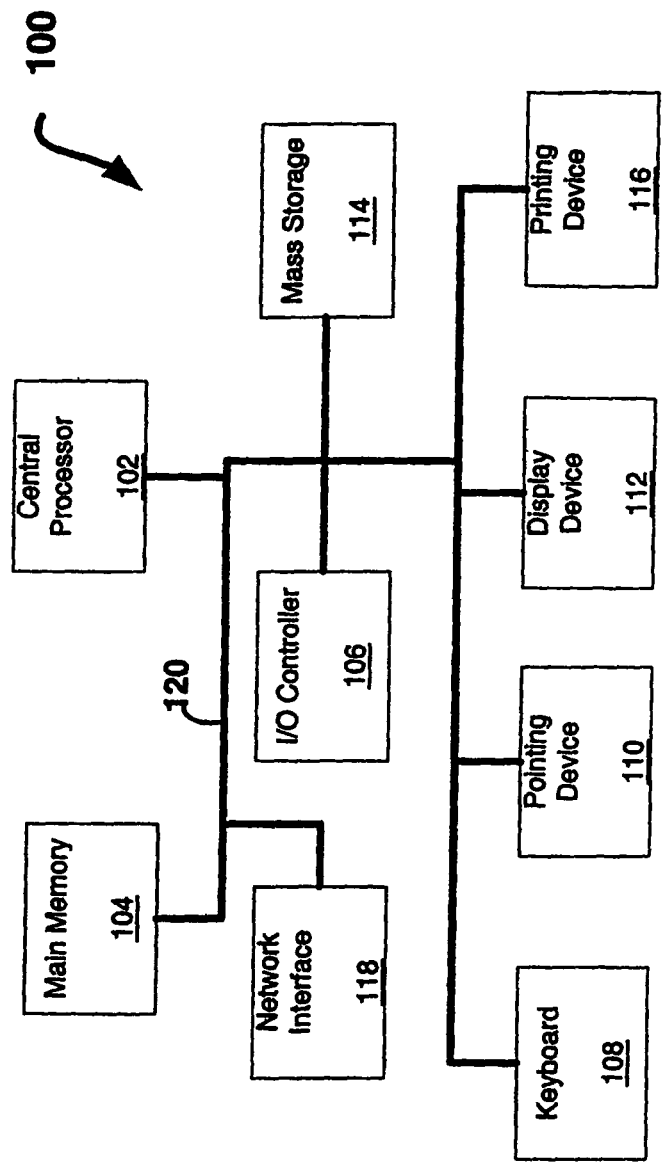
FIG. 1 is a block diagram of an exemplary system into which virtual presence architecture may be implemented.

FIG. 1 shows the basic format where the Video Presence Architecture (VPA) may be implemented. The computer system 100 comprises a central processor 102, a main memory 104, an input/output (I/O) controller 106, a keyboard 108, a pointing device 110 (e.g. mouse, track ball, stylus, or the like), a display device 112, a mass storage 114 (e.g. hard disk, optical drive, or the like), and a network interface 118. Additional I/O devices, such as printing device 116, may be included in the computer system 100 as desired.

The system also comprises system bus 120, or similar architecture through which some or all of the components shown communicate with each other. Additionally, those with ordinary skill in the art will recognize that computer system 100 can include an IBM-compatible personal computer utilizing an Intel microprocessor, or any other type of computer. Additionally, instead of a single processor, two or more processors can be utilized to provide faster operations.

The network interface 118 provides communication capability with other computer systems on the same local network, on a different network connected via modems and the like to the present network, or to other computers across the Internet. In various embodiments, the network interface 118 can be implemented in Ethernet, Fast Ethernet, Gigabit Ethernet, wide-area network (WAN), leased line (such as T1, T3, optical carrier 3 (OC3), and the like), digital subscriber line (DSL and its varieties, such as high bit-rate DSL (HDSL), integrated services digital network DSL (IDSL) and the like), time division multiplexing (TDM), asynchronous transfer mode (ATM), satellite, cable modem, Universal Serial Bus (USB) and FireWire.

Figure 2:
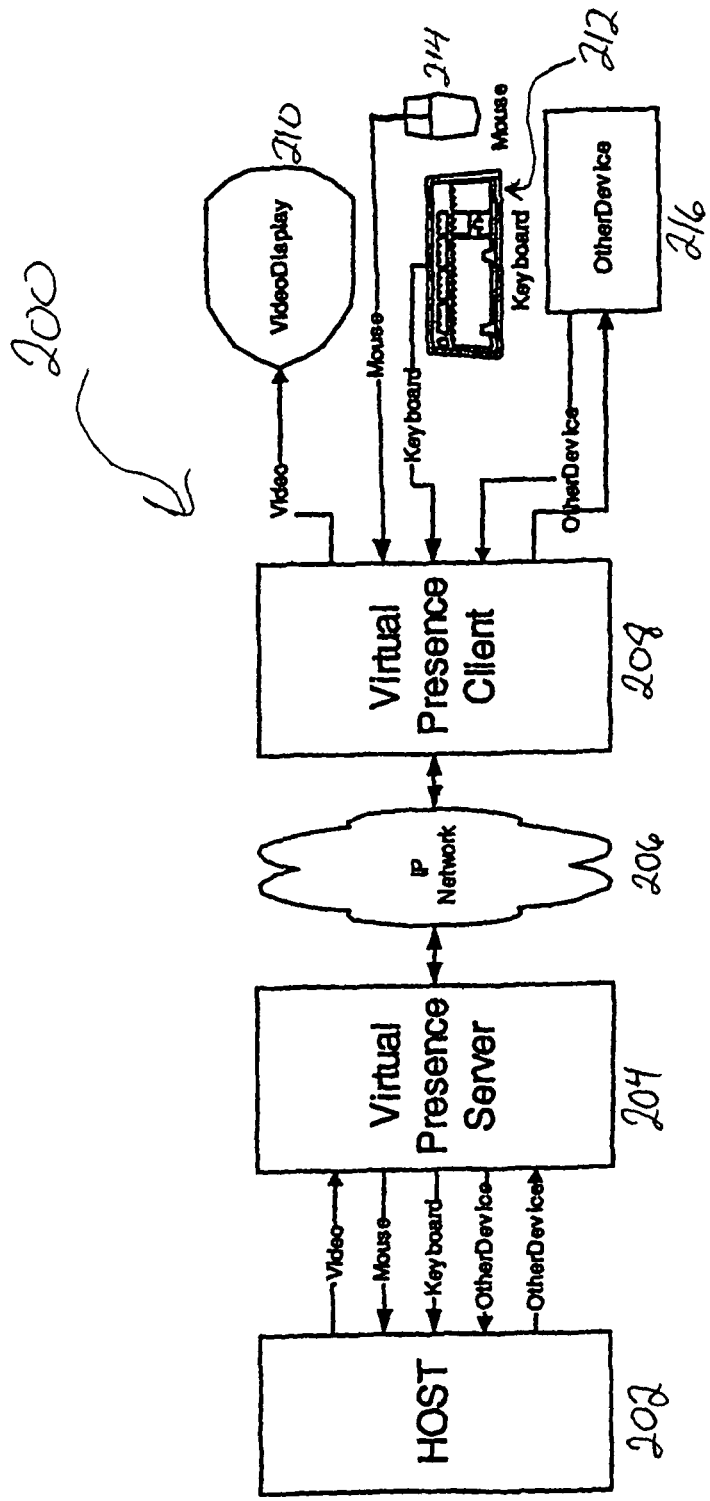
FIG. 2 is an exemplary block diagram of a virtual presence architecture.

FIG. 2 illustrates an exemplary block diagram of a Virtual Presence Architecture (VPA) in accordance with an embodiment of the present invention.

Table 1 below provides a glossary of the terms used to describe the VPA architecture in accordance with some embodiments of the present invention (such as those discussed with respect to Figs. herein).

TABLE 1

Glossary of Terms

| TERM | GLOSSARY |
|---|---|
| Capture | The process of digitizing and formatting data for processing. |
| Decode | Decode: the process of converting data encoded, e.g., by a virtual presence encoder for a device into a form suitable for transfer to that device. |
| Encode | The process of converting signals captured for a device into a form suitable for transfer to, e.g. a virtual presence decoder. |
| Host | The remote computer that is to be controlled form the local client. |
| NIC | Network interface connection, i.e., the device that provides network connectivity. |
| VPC | Virtual presence client; the subsystem that captures keyboard, mouse and other local device inputs for transmission to the VPS, and decodes the video display and other outputs from the VPS |
| VPP | Virtual presence protocol; the syntax and semantics of the messages exchanged by the VPS and the VPC. The VPP may be implemented on transmission control protocol (TCP) and user datagram protocol (UDP) over IP in an embodiment of the present invention |
| VPS | Virtual presence server; the subsystem that captures the hardware outputs of the host, encodes them for transmission to the VPC, and decodes the keyboard, mouse and other device inputs transmitted by the VPC. |
| Message Multiplexer | The entity that receives messages and tags them as being a particular type, then delivers them to be compressed and optionally encrypted. |
| Message Demultiplexer | The entity that takes decrypted and decompressed data from the stream and delivers it to the receiver registered to get that message type. |
| Frame Buffer | Memory where the digital image of the screen is stored; in an embodiment of the present invention, it consists of 16 bit pixels with 5 bits each for Red, Green and Blue intensity. |
| Tile | 256 pixel area of the frame buffer treated as a unity by the video subsystem in accordance with an embodiment of the present invention. |

In FIG. 2, the VPA 200 includes a Virtual Presence Server (VPS) 204 co-located with the remote host 202 and a Virtual Presence Client (VPC) 208 at a location remote from the VPS. The host 202 interacts with the devices connected to the VPC (such as video display 210, keyboard 212, mouse 214, and other device 216) as if they were connected directly to host 202. In one embodiment of the present invention, an advantage of this approach is the flexibility in the design and deployment of the VPS 204.

FIG. 2 further demonstrates that keyboard 212, mouse 214, other device 216 send their respective signals to the VPC 208. PC 208 captures the hardware outputs of the keyboard 212, mouse 214, and other device 216 and encodes them for transmission to the VPS. The transmission to the VPS can take place over IP Network 206, which is connected to host computer 202. Following transmission, the signals arrive in VPS 204, which decodes the keyboard, mouse and other device inputs transmitted by the VPC. These inputs are then sent to the host computer, where the input commands are executed. Following the execution of the keyboard, mouse other device commands, host 202 sends a hardware output in the form of a video signal displaying changes resulting from the input commands and a signal for the other device 216. The VPS 204 captures the hardware outputs and encodes them for transmission to the VPC 208 over IP Network 206. VPC 208 then decodes the video and other device outputs from the VPS and transmits them to either video display 210 or other device 216.

Figure 3:
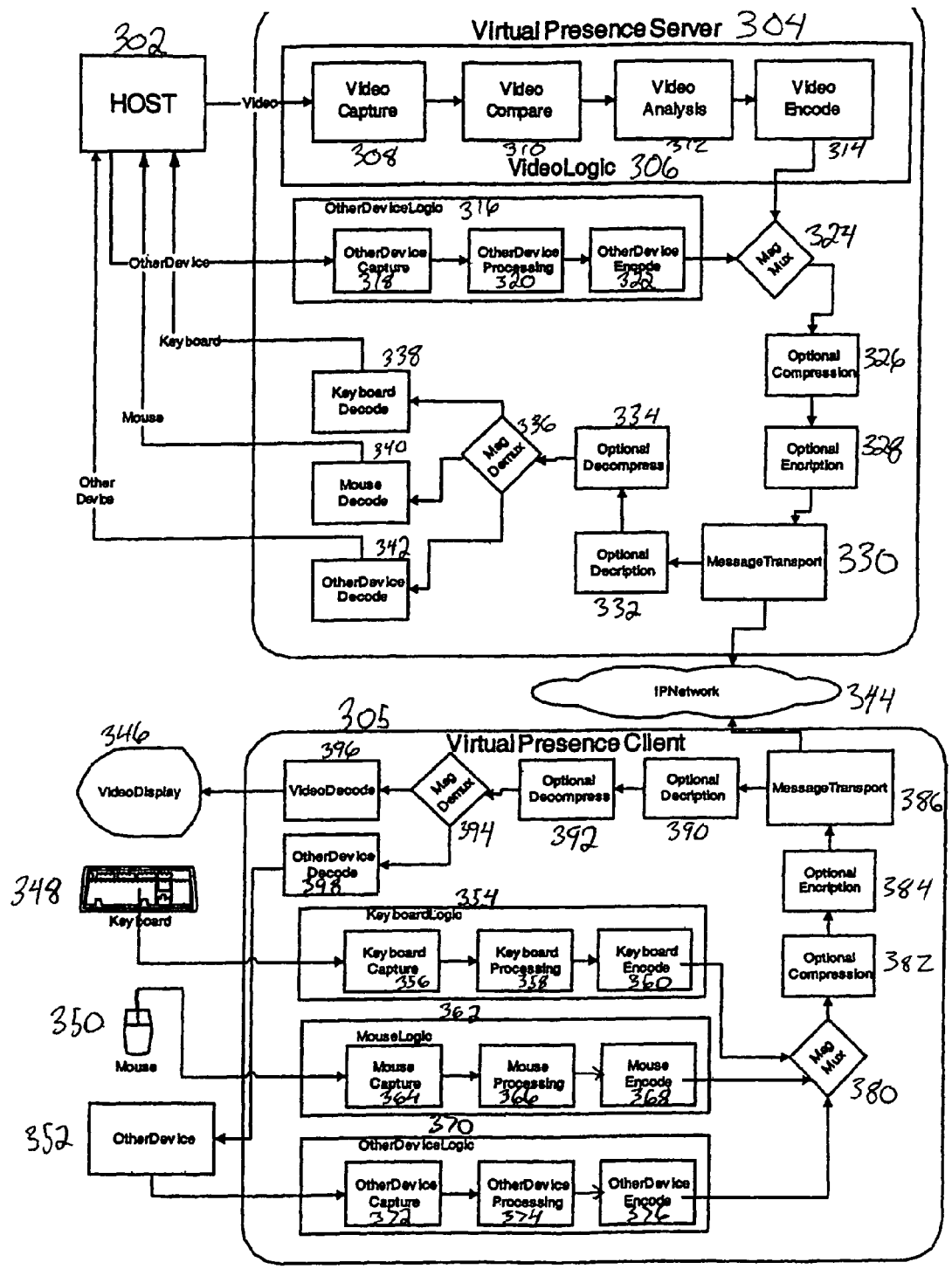
FIG. 3 is a more detailed block diagram of a virtual presence architecture.

FIG. 3 illustrates a more detailed block diagram of a VPA in accordance with another embodiment of the present invention. Here, VPC 305 accepts signals from keyboard 348, mouse 350, and other device 352. These signals are then input to Keyboard Logic 354, Mouse Logic 362, and Other Device Logic 370, respectively. Inside each of the logic devices, the respective signals are captured at steps 356, 364, and 372, respectively, and are digitized and formatted for processing at steps 358, 366, and 374, respectively. After processing, the signals are encoded at steps 360, 368, and 376, respectively, by converting the captured signals for each device into forms suitable for transfer to a decoder, such as a Virtual Presence decoder. After the signals are encoded, they are sent to multiplexer 380, which combines the keyboard, mouse and other device signals in preparation for transmission to the VPS 304. However, before transmission, the signals can optionally be compressed in step 382 and/or encrypted in step 384. Then the signals are transported in 386 via IP network 344 to the VPS 304.

Once in VPS 304, the signals are decrypted and decompressed in items 332 and 334, respectively, if required. The input signals are then demultiplexed in 336 in order to separate the signals for decoding in items 338, 340, and 342. Then the keyboard, mouse and other device signals are sent to the host 302, where the commands are executed internally. Following the execution of the keyboard, mouse and other device inputs, two hardware output signals are transmitted back to VPS 302, the video output signal and the other device output signal. The video output signal enters Video Logic element 306, which captures, compares, analyzes and encodes the output in steps 308-314, respectively. The other device output signal is sent to Other Device Logic element 316, where it is captured, processed and encoded in steps 318-322, respectively. The encoded video and other device outputs are then multiplexed in step 324, and can optionally be compressed and/or encrypted in steps 326 and 328, respectively.

The multiplexed output signal is then transported in step 330 over IP Network 344 to the VPC 305. Once the output signal is back in the VPC, it is decrypted and decompressed, if need be, in steps 390 and 392, respectively. The output signal is then demultiplexed into separate video and other device signals in step 394. Following that, the two signals are decoded in steps 396 and 398, and then sent to video display 346 and other device 352, where the outputs are displayed to the remote user. For example, the video output signal of host 302 is displayed on video display 346, and the other device output signal is executed on other device 352.

In another embodiment of the present invention, the devices in the VPA can be characterized by their data flow requirements. For example, the video logic system 306 on the VPS captures video frames, does delta analysis, and encodes the stream for the VPC to decode and display. This does not require any return information in accordance with an embodiment of the present invention. Similarly, the mouse and keyboard subsystems may simply transmit the stream from their corresponding devices on the VPC for transmission to the VPS. On the other hand, special devices such as USB may require bi-directional transfers which are treated as independent directional flows by the architecture.

In a further embodiment of the present invention, the VPS captures video and transmits it to the VPC. For example, the VPS receives the mouse and keyboard data streams from the VPC and decodes them into signals for the Host. The VPS manages input and output data streams for other devices and simulates the local interactions necessary to provide remote functionality.

In accordance with another embodiment of the present invention, the keyboard and mouse may both be simple byte streams. Therefore, there would be little processing necessary to decode the streams. However, there is significant processing to maintain synchronization and duplicate the semantics and timing of the streams so that the Host can properly maintain its states as if the devices were directly connected.

More specifically, in an embodiment of the present invention, the VPS keyboard subsystem relays the byte stream from the remote keyboard to the Host without any additional processing. In a further embodiment, the VPS mouse subsystem relays the byte stream from the remote mouse to the Host. This byte stream may include "delta" messages (e.g. indicating change), which are interpreted by the Host relative to the current position of the cursor. Due to timing and other issues, the relative position of the cursor can get out of sync. Consequently, special processing in both the VPS and VPC can be used to mitigate this problem.

Figure 4:
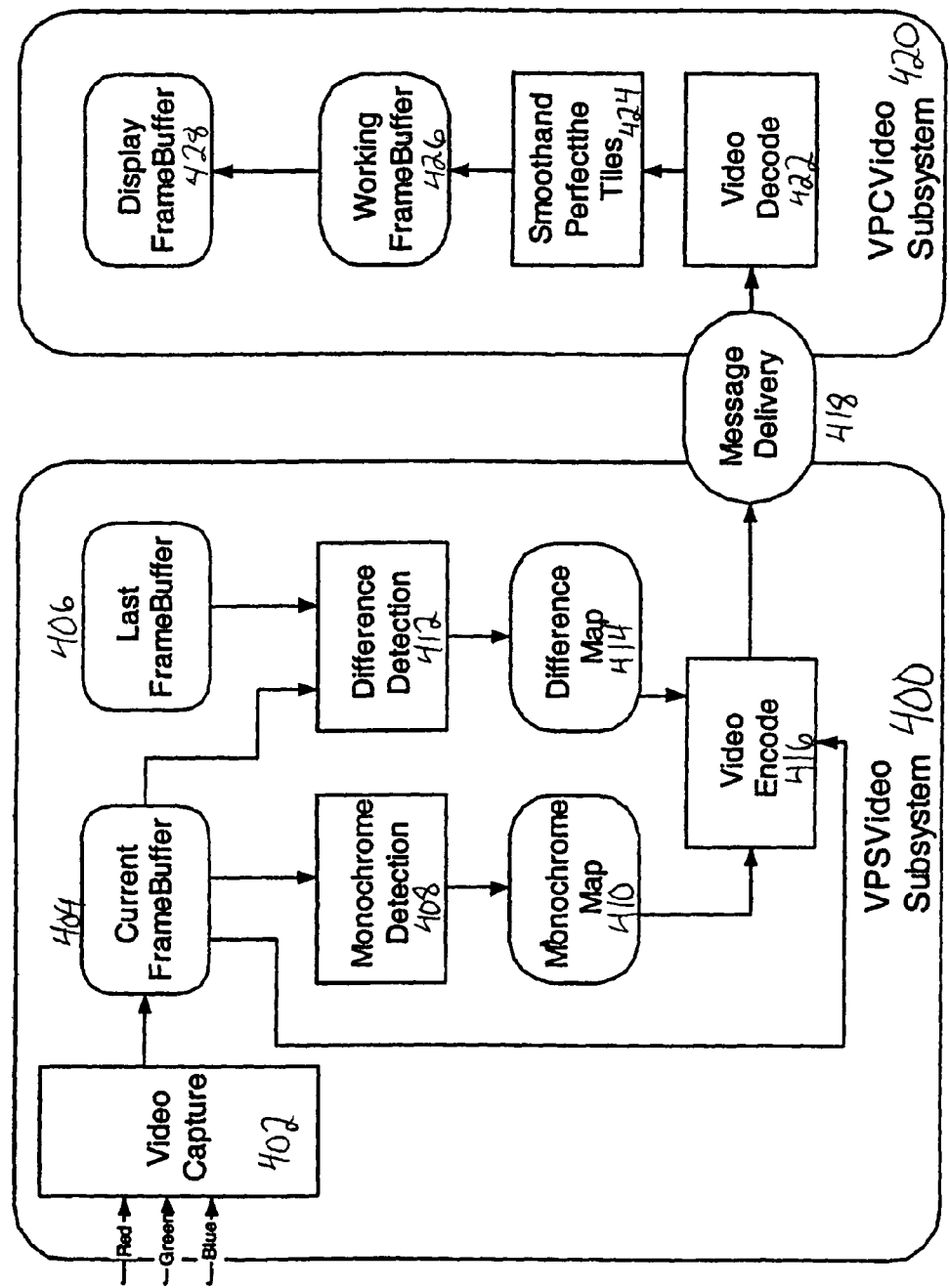
FIG. 4 illustrates an exemplary flow for the VPS and VPC video subsystems

FIG. 4 illustrates an exemplary flow for the VPS and VPC video subsystems in accordance with an embodiment of the present invention. Since video is often the most data intensive part of the Virtual Presence system, the most significant processing occurs in this component. VPS Video subsystem 400 captures the red, green and blue (RGB) video signals outputted from a host computer in step 402. The RGB signals are then transmitted to Current Frame Buffer 404. The illustrated video subsystem may be implemented in accordance with two characteristics of a computer's video display (such as the system discussed with respect to FIG. 1). Because screens may be primarily one color and because the screen typically only changes in local areas, leaving most of the display the same, the video subsystem can take advantage of these characteristics to provide significant reductions in the required data.

In an embodiment of the present invention, the VPS video logic may specifically benefit from the creation of custom hardware to support the process. In another embodiment of the present invention, a field-programmable gate-array (FPGA) may be utilized to implement the logic in hardware. Further information regarding an FPGA apparatus for a VPA is later described in detail.

For example, in one embodiment, the video may be first captured into one of two frame buffers that alternate between being the current frame buffer 404 and the last frame buffer 406. In the present embodiment, the frame buffer is divided into "tiles" of 256 pixels. The Monochrome detection logic 408 analyzes each tile to see if its pixels are within a specified difference in color. If they are, then the Monochrome Map 410 corresponding to that tile receives a 1; otherwise, it receives a 0. The Difference Detection logic 412 compares each pixel in the Current frame buffer 404 with the corresponding pixel in the Last frame buffer 406. If more than a specified number of pixels have changed, then the bit corresponding to this tile is set to one in the Difference Map 414; otherwise it is set to zero.

In accordance with another embodiment of the present invention, the video encoder 416 then processes the two maps minimizing the data transmitted to indicate which tiles are changed, and sending a "raw" tile or a "monochrome" tile or a "no change" tile, and using, for example, run-length encoding to eliminate duplicates. The encoded stream is then passed to the message delivery subsystem 418 for optional compression and encryption, and then transmission to the VPC 420.

It is envisioned that other devices may be remotely connected to the host using a similar architecture. For example, a USB device, which provides a serial connection to deliver a stream of bytes between two entities. USB devices have certain timing and signaling characteristics that are required for their function. Additionally, because USB is bi-directional, a complete encode and decode subsystem may be implemented for both the VPS and VPC.

Moreover, the VPS may implement the logic necessary to emulate the USB device for the Host. The VPC may implement the logic necessary to emulate the Host for the USB device. This may require buffering of the byte stream on both ends and emulating the timing characteristics required. This may also require special processing, similar to the video subsystem, depending on the particular device. In particular, new digital display devices, such as liquid crystal displays (LCDs) are replacing traditional cathode ray tubes (CRTs) in many applications, and are connected using USB technology.

In a further embodiment of the present invention, the VPC 420 captures keyboard and mouse data streams, encodes them, and transmits the streams to the VPS 400. The VPC 420 later receives an encoded video stream, decodes it in step 422, and then processes the stream to remove encoding artifacts in step 424. The VPC then transfers the image to its own display, mapping the pixel image as needed. In particular, because the mouse is used as a pointing device and its motion is translated to a cursor on the video image, special processing may be utilized to keep the VPC cursor synchronized with the Host cursor.

Moreover, since the VPS may have no access to information about the internal state of the host (e.g., if the host operating system does not operate in a deterministic manner on the given inputs), the host state may become out of sync with the VPC. In particular, Microsoft Windows operating systems periodically ignore mouse moves, which can cause a significant problem.

In one embodiment of the present invention, the USB protocol is utilized to provide movement of the mouse to an absolute position. In a further embodiment of the present invention, human interface descriptors (HIDs) are utilized, which can define many different types of devices, some of which support moving a pointer to an absolute position (e.g., move to coordinates x543, y234). A PC tablet, for example, would use one of these descriptors supporting the movement of a pointer to an absolute position. If a remote KVM device uses one of these absolute descriptors, then it will not lose mouse sync and the physical and virtual mouse pointer will always be in sync. This eliminates the rather complex set of algorithms, which may be otherwise required to make up for lost messages and signals, and keep the points in sync.

There are several different operating systems that use USB, such as Windows, MAC, Solaris, and Linux. Although each supports USB, every operating system may not support a specific set of HIDs. HIDs can, for example, include, but are not limited to, PC Tablets. In accordance with various embodiments of the present invention, the remote KVM system can solve this problem in several ways. In one embodiment, testing may be done ahead of time to determine which HIDs are supported by each OS. For example, it could be tested and determined that Windows supports the use of a PS/2 mouse. Then the device code may be written to ask which OS the host computer is using. Once this information is obtained, the USB channel can be initialized with the correct HIDs. Another method of automatically accomplishing this would be to try different HIDs and determine which ones work. This method would avoid the need to test different operating systems before the synchronization method is implemented. Additionally, this would allow for the synchronization method to be used on operating systems that are not currently available. However, in each of the aforementioned methods, the logical and actual host mouse position can be synchronized transparently, without the need for operator intervention.

In another embodiment of the present invention, the VPC encodes the byte stream from the local keyboard and delivers it to the message subsystem, which in turn optionally compresses and encrypts the stream. The byte stream is then delivered to the VPS. Keyboard processing is envisioned to be a simple direct transfer with no feedback between the VPS and VPC, in accordance with an embodiment of the present invention.

In a further embodiment of the present invention, the VPC encodes the byte stream from the local mouse and delivers it to the message subsystem, which in turn optionally compresses and encrypts the stream, and then delivers it to the VPS. The encoding consists of aggregating mouse move messages and transmitting them. Additional processing may be performed by the mouse subsystem to keep the cursors synchronized.

In another embodiment of the present invention, the VPC receives an encoded video stream from the VPS. The VPC decodes the stream into a working buffer, which it then processes to remove artifacts of the encoding algorithm used. Then the working buffer is transmitted to the actual display buffer on the VPC, which the video hardware displays on the local display device.

It is envisioned that the architecture discussed herein may be implemented in many different ways. In various embodiments of the present invention, the Virtual Presence Architecture may be implemented utilizing one or more different techniques. For example, a heavily pipelined application specific integrated circuit (ASIC) or FPGA to create the Tile Map and the Monochrome Map may be used. Also, when compressing and sending large data blocks, they may be split up, so they overlap (for example: compress some data while sending some data. Further, DIB Section application programming interfaces (API's) on Windows, or DirectX may be used. Additionally, to enhance compression, the extents of the changed area on the display can be detected and only info for that area can be sent. Also, the client may start the request for a next update area before it processes a current area, or the server may automatically prepare the next update area. Further, if there is more than one Monochrome or No Change tile, they may be stacked together and sent as one count. Speed can also be increased by overlapping as many operations as possible that can happen in parallel and, for example, blending the edges with a surrounding area when painting the monochrome tile on the client. Further, for slower links such as Dial-up or DSL, the packet turn around time can be relatively long, so one can modify any transport used to send long streams of packets and not spend time waiting for acknowledgements. Also, a compression function can be picked that is balanced in time with the transport time (for example, one may avoid spending more time compressing than the bandwidth of the transport may easily handle). Also, the client code can be tuned to the native OS and CPU for best performance. Finally, for very slow transports, extra time can be spent to break up tiles into subsections, and reduce data (e.g., blend groups or pixels into one, or reduce to 8-bit color instead of 32-bit color, and the like).

The foregoing description has been directed to specific exemplary embodiments of the present invention. It will be apparent to those with ordinary skill in the art that modifications may be made to the described embodiments of the present invention, with the attainment of all or some of the advantages. For example, the techniques of the present invention may be utilized for provision of remote situations, gaming and the like. Therefore, it is the object of the appended claims to cover all such variations and modifications as come within the spirit and scope of the invention.

The invention claimed is:

1. A method of providing mouse synchronization between a logical mouse and an actual mouse, comprising:
    testing an operating system of the logical mouse to determine if the operating system of the logical mouse supports the use of a USB-based human interface descriptor (HID) using absolute movement of a mouse cursor to an absolute position other than the origin;
    utilizing a universal serial bus (USB) protocol to provide absolute movement of the mouse cursor on a host computer to an absolute position other than the origin if the operating system supports the use of a USB-based human interface descriptor (HID) using absolute movement of the mouse cursor to an absolute position other than the origin, and
    synchronizing the position of a logical mouse and the position of an actual mouse using the absolute movement to the absolute position other than the origin without operator intervention.

2. The method of claim 1, wherein a virtual presence client (VPC) calculates said logical mouse position.

3. The method of claim 1, wherein utilizing the universal serial bus (USB) protocol to provide the absolute movement of the mouse cursor comprises sending USB commands across an IP network.

4. The method of claim 1, further comprising buffering USB commands between the actual mouse and the host computer.

5. The method of claim 1, further comprising emulating the timing characteristics of the actual mouse when applying USB commands to the host computer.

6. The method of claim 3, further comprising aggregating mouse movement commands prior to sending the mouse movement commands across the IP network.

\* \* \* \* \*